United States Patent
Oak et al.

(10) Patent No.: US 6,597,408 B1
(45) Date of Patent: Jul. 22, 2003

(54) FINE TUNING METHOD FOR DIGITAL TELEVISION

(75) Inventors: Sang Soo Oak, Taegu (KR); Sang O Park, Kumi (KR)

(73) Assignee: LG Electronics Inc., Seoul (KR)

( * ) Notice: Subject to any disclaimer, the term of this patent is extended or adjusted under 35 U.S.C. 154(b) by 426 days.

(21) Appl. No.: 09/585,401

(22) Filed: Jun. 2, 2000

(30) Foreign Application Priority Data

Jun. 3, 1999 (KR) .......................... 99-20425

(51) Int. Cl.[7] ................................ H04N 5/50
(52) U.S. Cl. .................. 348/731; 348/569; 348/570
(58) Field of Search ................ 348/731, 732, 348/733, 569, 570; 455/182.3, 183.2, 186.1, 192.3; H04N 5/50, 5/44

(56) References Cited

U.S. PATENT DOCUMENTS

| | | | | |
|---|---|---|---|---|
| 5,237,443 A | * | 8/1993 | Kurisu et al. | 348/570 |
| 5,371,550 A | * | 12/1994 | Shibutani et al. | 348/570 |
| 5,428,405 A | * | 6/1995 | Lee | 348/731 |
| 5,452,023 A | * | 9/1995 | Kim | 348/731 |
| 5,712,690 A | * | 1/1998 | Kim | 348/570 |
| 6,344,882 B1 | * | 2/2002 | Shim et al. | 348/731 |

* cited by examiner

Primary Examiner—John Miller
Assistant Examiner—Trang U. Tran

(74) Attorney, Agent, or Firm—Birch, Stewart, Kolasch & Birch, LLP

(57) ABSTRACT

The present invention relates to a fine tuning method for a digital television set. In an automatic fine tuning method, when a channel switching command is inputted to a microprocessor on user's demand, the microprocessor writes the PLL of a corresponding channel and then detects a segment synchronization signal. In a synchronization signal is detected, the microprocessor repeats the process of setting a flag that has acquired synchronization, storing the SNR and detecting a segment synchronization signal by moving the frequency. Then, if a synchronization signal is not detected, the microprocessor detects whether or not there is a synchronization acquired. If there is no synchronization acquired, the microprocessor repeats the above process by moving the frequency, or if there is a synchronization acquired, it tunes the frequency to the maximum value of SNRs. Meanwhile, a manual fine tuning method for a digital television set includes a first step of displaying a signal level display pattern and a fine tuning value display pattern on a screen of a television set, a second step of increasing or decreasing the displayed fine tuning value by inputting a fine tuning key, outputting tuning data corresponding to the position increased or decreased and adjusting the size of the signal level display pattern by detecting the signal to noise ratio, and a third step of inputting a confirm key when the size of the signal level display pattern is the maximum, judging the present frequency position to be the optimum, storing the SNR and finishing the manual fine tuning process.

3 Claims, 3 Drawing Sheets

FINE TUNING METHOD FOR DIGITAL TELEVISION

BACKGROUND OF THE INVENTION

1. Field of the Invention

The present invention relates to a digital television set, and in particular, to a fine tuning method for an ATSC digital television set.

2. Description of the Background Art

In an analog television set, techniques for a fine tuning apparatus are widely known and make it possible to provide a clean image and clear sound by tracking a transmission frequency distorted at a broadcasting station, a repeater, or a public hearing apparatus, and precisely tuning in to the same.

The above-described fine tuning techniques are roughly divided into two modes. The first mode is an automatic fine tuning (AFT) method, in which a frequency is finely tuned by observing an AFT voltage generated at an intermediate frequency (IF) stage, while tuning in to a predetermined modulation frequency corresponding to a user-selected channel using tuning data outputted from a microprocessor. At this time, the automatic tuning is carried out within a limited range of frequency, not covering a possible channel deviation range (-3 MHz~+3 MHz).

The second mode is a manual fine tuning method, in which a user moves a frequency to the maximum frequency position using a tuning frequency while observing a display state after channel switching.

However, a problem arises in that the fine tuning method used in such an analog television set is not available in a digital television set. The first reason is that it is difficult to generate an AFT voltage in case of fine tuning. In other words, the full-in range of a digital tuner is about one-fourth (approximately 400 KHz) of that of an analog tuner, which is too narrow.

In a case where a level of PLL (Phase Locked Loop) for tuning is at 125 KHz, locking is lost by the movement of the frequency by only one or two levels. Thus, it is almost impossible to generate an AFT voltage. Nevertheless, simplified automatic fine tuning is available because it is determined whether or not tuning is achieved, not by observing an AFT voltage, but by observing whether or not segment synchronization is applied to an analog waveform demodulated into a base band.

However, unlike the analog television set in which a horizontal synchronization is simply sliced, it is checked whether or not synchronization is obtained by observing synchronization patterns uniformly contained in a value that a data symbol can have. Thus, a problem arises in that it takes a large amount of time for tuning.

Secondly, it is impossible to set a frequency to an optimum frequency position while viewing a display state in case of manual fine tuning in the digital television set (unlike the analog television set). This is because of the specific characteristics of the digital television set, in which, when a signal to noise ratio (SNR) is greater than a certain level, an errorless image is displayed though it may be distorted at the maximum frequency position.

Thirdly, since digitally-encoded video signals are transferred being mixed with audio signals and all kinds of additional information, it takes a great deal of time (4~5 seconds) to parse data and scatter video signals on a screen whenever a frequency moves little by little. Therefore, it is impossible for a user who is accustomed to manual fine tuning in an analog television set to perform manual fine tuning while actually observing a screen.

SUMMARY OF THE INVENTION

Accordingly, it is an objective of the present invention to provide a fine tuning method for a digital television set which makes it possible to tune a frequency of a channel delivered from a broadcasting station during channel switching that is deviated from a predetermined frequency or a frequency distorted when it is outputted from an unattended repeater or a public hearing system to an optimum tuning frequency.

It is another objective of the present invention to manually move a tuning frequency to an optimum frequency according to a user's demand after automatic fine tuning or channel switching.

In order to achieve the above objectives, the present invention is characterized in that an optimum frequency is determined referring to the SNR of a signal demodulated under the condition in which automatic fine tuning referring to an AFT voltage used in the conventional analog television set is not available.

In addition, the present invention is characterized in that there is provided an effective user interface, in which an optimum frequency position is determined by displaying a level corresponding to a SNR, rather than by observing a display state, in case of manual fine tuning.

In order to achieve the above objectives, there is provided an automatic fine tuning method for a digital television set in accordance with the present invention, including; a first step of determining whether or not a segment synchronization signal is detected after outputting tuning data of a corresponding channel during channel switching; a second step of setting a flag that has acquired synchronization when a segment synchronization signal is detected in the above step, storing the SNR of a corresponding frequency, moving the frequency, outputting tuning data of the moved frequency, and determining again whether or not a segment synchronization signal is detected; a third step of determining whether or not there is a segment synchronization signal acquired if there is not segment synchronization signal detected in the first step; a fourth step of tuning in to the largest SNR among stored SNRs if there is a segment synchronization signal acquired in the third step; and a fifth step of repeatedly performing the step for moving the frequency, outputting tuning data corresponding to the moved frequency and detecting a segment synchronization signal, if there is no segment synchronization acquired in the second step.

In addition, a manual fine tuning method for a digital television set in accordance with the present invention includes: a first step of displaying a signal level display pattern and fine tuning value display pattern on a screen of a television set; a second step of increasing or decreasing the displayed fine tuning value by inputting a fine tuning key, outputting tuning data corresponding to the position increased or decreased and adjusting the size of the signal level display pattern by detecting the signal to noise ratio; and a third step of inputting a confirm key when the size of the signal level display pattern is the maximum, judging the present frequency position to be the optimum, storing the SNR and finishing the manual fine tuning process.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
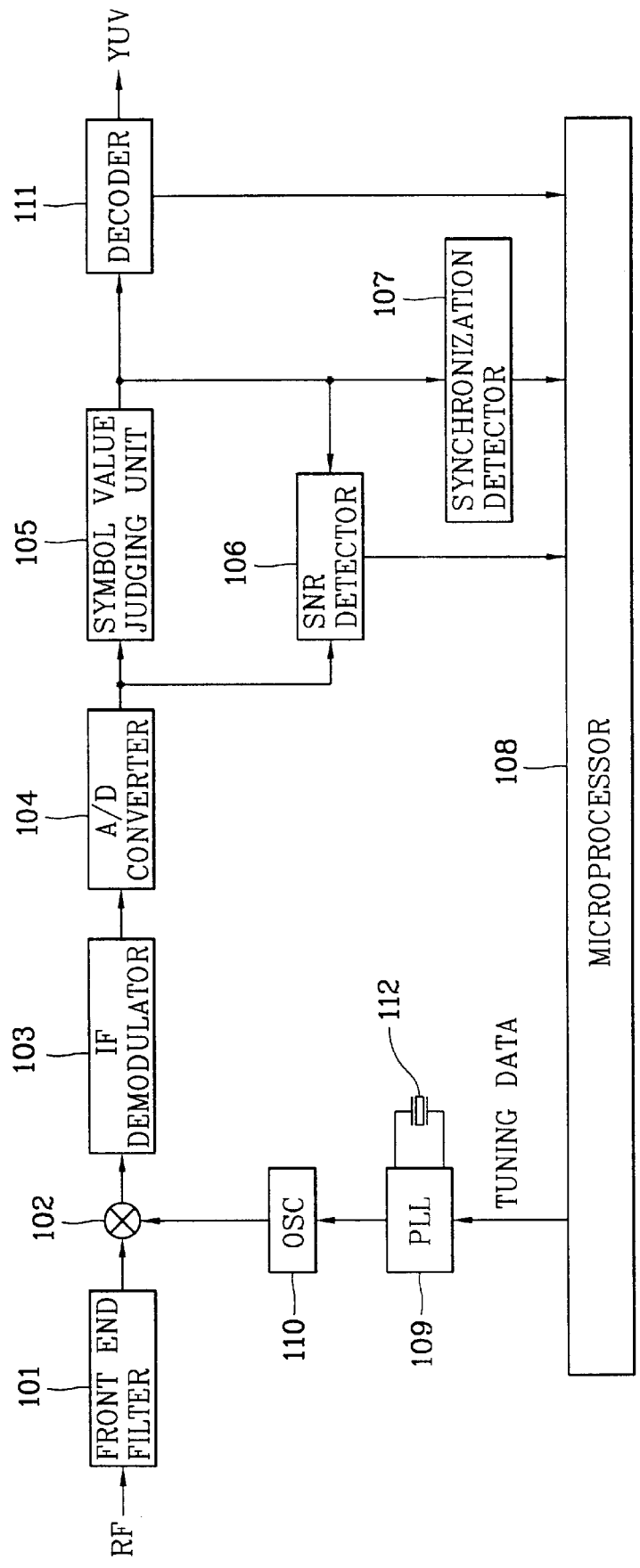
FIG. 1 is a block diagram of a general tuning apparatus for a digital television set.

FIG. 1 illustrates a block diagram of a tuning apparatus for a digital television set in accordance with a first embodiment of the present invention. As illustrated therein, the tuning apparatus in accordance with the present invention includes a front end filter 101 for detecting a user-selected channel in receipt of high frequency signal (IF), a mixer 102 for mixing an output signal from the front end filter 101 with an oscillation frequency and outputting an intermediate frequency signal (IF-OUT), an IF-demodulator 103 for lowering the output signal (IF-OUT) from the mixer 102 to a base band, an A/D converter 104 for sampling the output signal from the IF demodulator 103 and converting the same to a digital signal, a symbol value judge 105 for judging a symbol value by computing the output signal from the A/D converter, a SNR detector 106 for detecting the level of distortion by comparing the output signal from the symbol value judge 105 with the output signal from the A/D converter 104, a synchronization detector 107 for detecting a segment synchronization in receipt of the output signal from the symbol value judge 105, a PLL unit 109 for dividing the oscillation frequency and identifying the same with an oscillation frequency from a quartz oscillator 112 in receipt of tuning data, an oscillator 110 for outputting the oscillation frequency according to the output signal from the PLL unit 109 to the PLL unit 109 and the mixer 102, a decoder 111 for decoding the output signal from the symbol value judge 105 and outputting a video signal YUV, a microprocessor 108 for outputting tuning data to the PLL unit 109 during automatic fine tuning and repeating the operation of storing the output signal SNR from the SNR detector 106 if there is a synchronization signal detected by the synchronization detector 107, or outputting tuning data at the position of the maximum SNR among the above stored SNRs to the PLL unit 109 if there is no synchronization signal detected by the synchronization detector 107.

Figure 3:
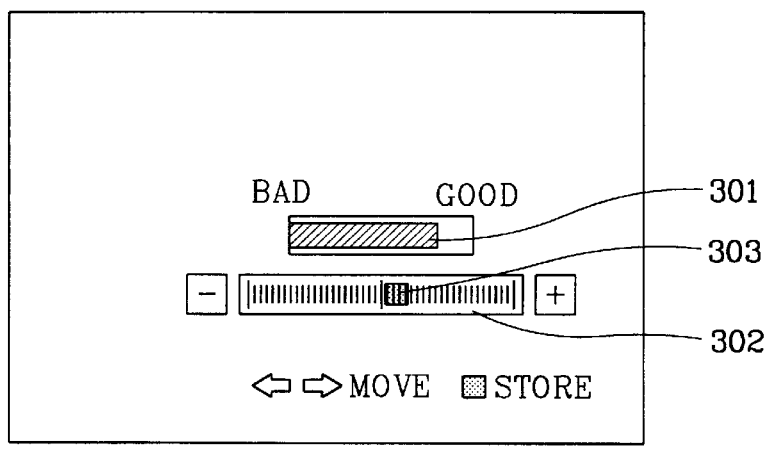
FIG. 3 is an exemplary view of a screen during manual fine tuning in accordance with a first embodiment of the present invention.

Herein, the front end filter 101 is a tracking filter. The microprocessor 108 is constructed such that it displays the signal level display pattern 301 and the fine tuning value display pattern 302 on the screen during manual fine tuning as illustrated in FIG. 3, then outputs corresponding tuning data to the PLL unit 109 when the fine tuning value display position is varied by the user, then reads the SNR from the SNR detector 106, and then adjusts the size of the signal level display pattern 301 according to the SNR.

The operation and effects of the first embodiment of the present invention will now be described.

Figure 2:
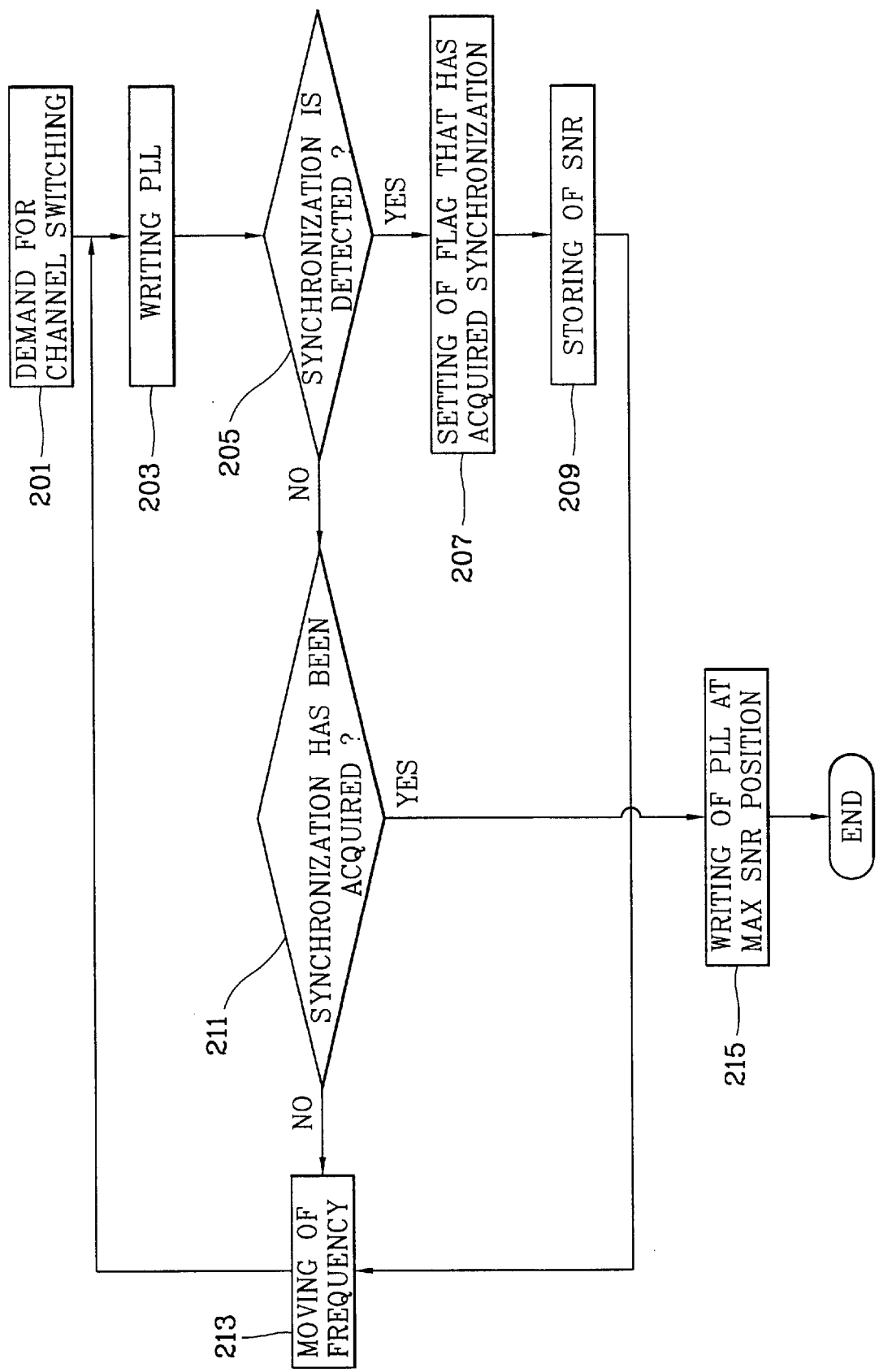
FIG. 2 is a flow chart of automatic fine tuning in accordance with the present invention.

The fine tuning in accordance with the present invention can be performed automatically and/or manually as described above. The automatic fine tuning will be described with reference to FIGS. 1 and 2.

First, a channel switching command is inputted to the microprocessor 108 by the user (in step 201). At this time, the microprocessor 108 outputs a PLL data value of a corresponding channel, that is, tuning data to the PLL unit 109 provided with a tuner (in step 203). Herein, the PLL unit 109 is a circuit for oscillating the oscillator (OSC) 110 according to a modulation frequency of the corresponding channel based on the tuning data value outputted from the microprocessor 108, which divides the oscillation frequency of the oscillator 110 according to the tuning data value outputted from the microprocessor 108 so that the frequency of the oscillator becomes identical with the frequency of the quartz oscillator 112. Thereafter, the oscillation frequency from the oscillator 110 is inputted to the mixer 102 to be mixed with the output from the front end filter. Thus, the tuning data value from the microprocessor 108 is a control value that determines how many times division is performed.

In addition, the front end filter 101 receiving a high frequency signal (RF) is a tracking filter. When detection is performed at a frequency width having one channel at both left and right sides including a channel corresponding to the tuning data value from the microprocessor 108, the mixer 102 outputs an intermediate frequency signal (IF-OUT) to the IF demodulator 103 by multiplying the output signal from the front end filter 101 by the oscillation frequency outputted from the oscillator 110.

Accordingly, when the IF demodulator 103 lowers the output signal from the mixer 102 to the base band, the A/D converter 104 converts the resultant output signal to a digitally-converted discrete-time signal by sampling. Herein, the output signal from the A/D converter 104 is a symbol value formed by binding a certain number of binary digital signals. For example, in case of 8-VBS system, one symbol value is formed by binding three binary digital signals. At this time, the symbol value judge 106 judges a symbol value in receipt of the output signal from the A/D converter 104. The A/D converted signal is not exactly the same as the symbol value transferred from the broadcasting station because error components of sampling timing and channel distortion are reflected on this signal. Thus, the symbol value judge 105 determines to which value among 8 possible symbol values the symbol value transferred from the broadcasting station is closest to.

Therefore, the decoder 111 classifies image data, voice data and various additional information based on a set protocol in receipt of a determined symbol value, and decodes them. In case of image data, they are outputted as luminance/color difference signals or primary color signals.

In addition, when the symbol value judge 105 determines the symbol value transferred from the broadcasting station in receipt of the output signal from the A/D converter 104, the SNR detector 106 detects information distorted by thermal noise, multiple path ghosts, etc., and the synchronization detector 107 detects a segment synchronization repeatedly inserted by searching the output signal from the symbol value judge 105.

Herein, the segment synchronization is a signal corresponding to a horizontal synchronization in an analog television set, which is formed of values that a data symbol can usually have, has patterns of '5', '−5' and '−5.5', and is inserted in '832' symbol cycle. Therefore, the microprocessor 108 that has lighted the tuning data value to the PLL unit 109 determines whether or not a segment synchronization is detected by searching the output signal from the synchronization detector 107 (in step 205).

At this time, when it is determined that a segment synchronization is detected, the microprocessor 108 sets a flag that has acquired synchronization (in step 207). Thereafter, the SNR detected from the SNR detector 106 corresponding to the present channel frequency is read and then stored in the internal memory (in step 209). Subsequently, the tuning data is outputting to the PLL unit 109 again in order to move the frequency a little from the previous frequency for tuning (in step 215).

Therefore, when the synchronization detector 107 continuously detects a segment synchronization, the microprocessor 108 stores the SNR outputted from the SNR detector 106 corresponding to the present frequency in the internal memory and outputs tuning data for frequency movement to the PLL 109. That is, the process in which, when a segment synchronization is detected after outputting a tuning data to the PLL unit 109 on demand for channel switching, the SNR corresponding to the present frequency is stored and the tuning data for frequency movement is outputted to the PLL unit 109, is repeatedly performed while synchronization is continuously detected, whereby the SNRs for all possible frequency positions at which a segment synchronization is acquired are stored.

When it is determined whether or not a segment synchronization is detected after outputting a tuning data value to the PLL unit 109 on demand for channel switching, the microprocessor 108 determines whether or not there is a synchronization acquired (in step 211) in the case that a segment synchronization is not detected by the synchronization detector 107 because a moving frequency is too much distorted. If there is no synchronization acquired in the present step for channel switching, the microprocessor 108 repeatedly performs the process for moving the frequency little by little (in step 213).

Afterwards, if there is a synchronization acquired when a segment synchronization is not detected, the microprocessor 108 moves the frequency little by little on demand for channel switching, extracts the maximum. SNR by comparing stored SNRs and outputs a tuning data value corresponding to the frequency in response to the maximum SNR to the PLL unit 109, whereby the frequency is tuned to a frequency with the best signal quality and the operation of channel switching is finished in step 215.

Figure 4:
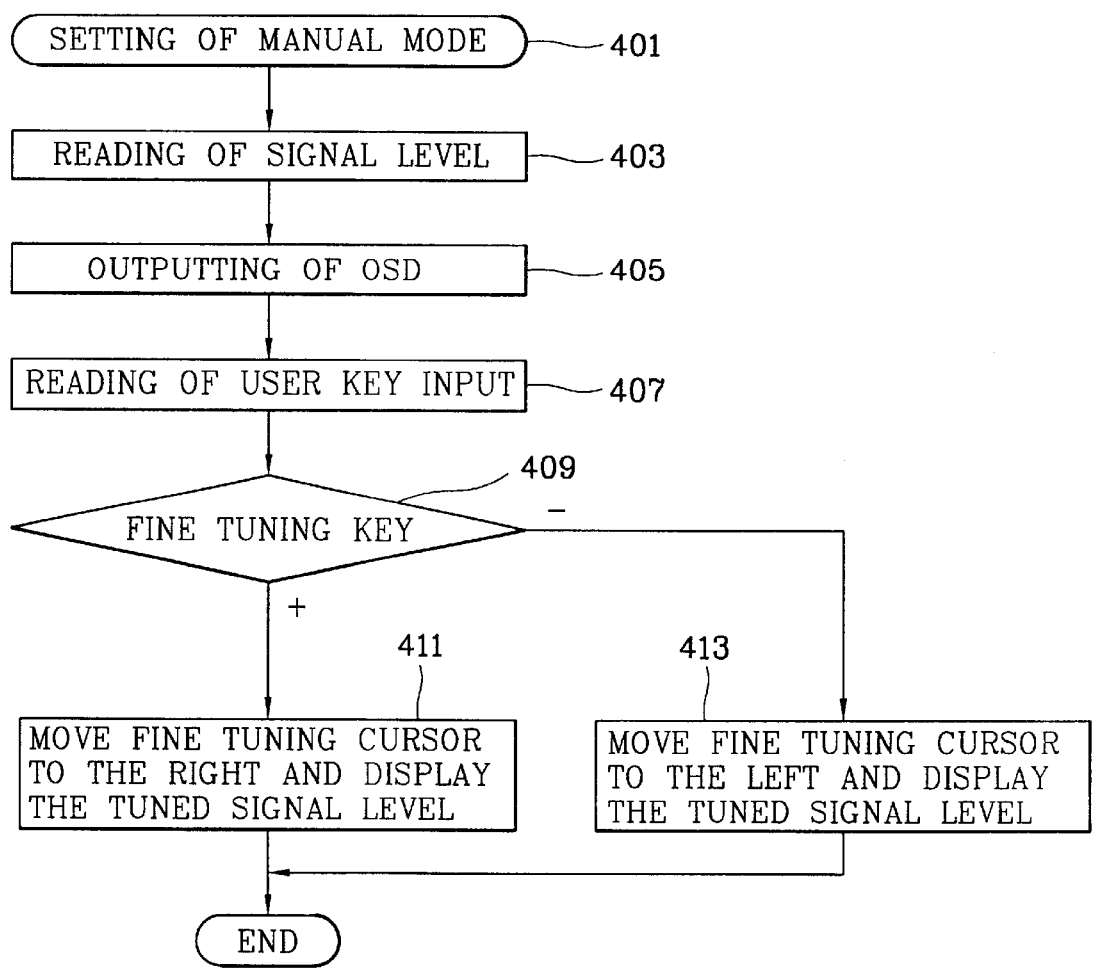
FIG. 4 is a flow chart of manual fine tuning in accordance with a first embodiment of the present invention.

Meanwhile, the manual fine tuning of the present invention is provided on user's demand after automatic fine tuning or channel switching, which is performed in the procedure as illustrated in FIG. 4.

In this procedure, firstly, the user sets a manual fine tuning mode using a key input unit or a remote controller mounted on the set (in step 401). At his time, the microprocessor 108, as illustrated in FIG. 3, controls a display apparatus(not shown) so that it displays the fine tuning value display pattern 302 for notifying a varied frequency position and the signal level display pattern 301 for showing a SNR extracted from the front and back ends of the A/D converter 104 (in step 403).

Thereafter, the microprocessor 108 displays the position of the presently tuned frequency on the fine tuning value display pattern 302 by a cursor 303, and displays the SNR corresponding to the position of the presently tuned frequency on the signal level display pattern 301 (in step 405).

According to this, when the cursor 303 is moved to the '+' or "−" using left and right(or up and down) shift keys (in step 409), the microprocessor 108 outputs the then data to the PLL unit 109, reads the SNR from the SNR detector 106, and thereby adjusts the size of the signal level display pattern 301 (in step 413).

When the user presses a storage key(or confirm key) at a frequency position at which the size of the signal level display pattern 301 is the largest while moving the frequency by repeated the above process of manual fine tuning, the microprocessor 108 stores the SNR at the present frequency position and finishes the operation of manual fine tuning.

Herein, the reason why manual fine tuning is performed is that, since an errorless images is generated even though not at the optimum frequency position when the SNR is more than some degree of threshold as a matter of the characteristics of a digital television set, the movement to the optimum frequency position makes it possible to cope with dynamic changes in channel. In addition, the reason why the signal level display pattern 301 is displayed in manual fine tuning is that it takes much time for a digital television set to display after tuning, so that fine tuning is performed while viewing the signal level display pattern 301 before images are displayed on the screen, thereby solving the problem of too much time being taken for fine tuning.

In addition, in the embodiment of the present invention, the signal level display pattern 301 and the fine tuning value display pattern 302 are displayed in a bar. Besides, the signal level display pattern 301 and the fine tuning value display pattern 302 can be displayed in such a manner that the frequency position is displayed on a graph, the number corresponding to a level value is displayed whenever the frequency is tuned to each frequency position, or the combination of the above methods is used at the same time.

As seen from above, in the present invention, a digital television set of VSB modulation type effectively performs fine tuning to thus set the frequency to the optimum frequency position, thereby coping with dynamic changes in channel. In addition, in the present invention, fine tuning is performed by displaying a signal level meter, so that the problem of too much time being taken can be solved in case of manual tuning while viewing the screen.

As the present invention may be embodied in several forms without departing from the spirit or essential characteristics thereof, it should also be understood that the above-described embodiments are not limited by any of the details in the foregoing description, unless otherwise specific, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A fine tuning method for a digital television set comprising:
    a first step of determining whether or not a segment synchronization signal is detected after outputting tuning data of a corresponding channel during channel switching;
    a second step of setting a flag that has acquired synchronization when a segment synchronization signal is detected in the above step, storing the SNR of a corresponding frequency, moving the frequency and outputting tuning data of the moved frequency, wherein said step of setting, storing and moving is performed by a microprocessor;
    a third step of determining again whether or not a segment synchronization signal is detected;
    a fourth step of determining whether or not a segment synchronization signal acquired if there is no segment synchronization signal detected in the first step;
    a fifth step of tuning in to the largest SNR among stored SNRs if there is a segment synchronization signal acquired in the third step; and a sixth step of repeatedly performing the step for moving the frequency, outputting tuning data corresponding to the moved frequency and detecting a segment synchronization signal, if there is no segment synchronization acquired in the second step.

2. A fine tuning method for a digital television set, comprising:

a first step of displaying a signal level display pattern and a fine tuning value display pattern on a screen of said digital television set;

a second step of increasing or decreasing the displayed fine tuning value in said digital television set by inputting a fine tuning key, outputting tuning data corresponding to the position increased or decreased and adjusting the size of the signal level display pattern by detecting the signal to noise ratio; and a third step of inputting a confirm key when the size of the signal level display pattern is the maximum, judging the present frequency position to be the optimum, storing the SNR and finishing the manual fine tuning process for said digital television set.

3. The method of claim 2, wherein the signal level display pattern and the fine tuning value display pattern are displayed in a certain shape, on a graph, by the number corresponding to the signal level, or by using a combination of the above methods.

* * * * *